Dec. 6, 1960  A. A. LACHANCE ET AL  2,962,827
HANDLES FOR GROCERY CARTS AND INDENTIFICATION MEANS THEREFOR
Filed July 15, 1959
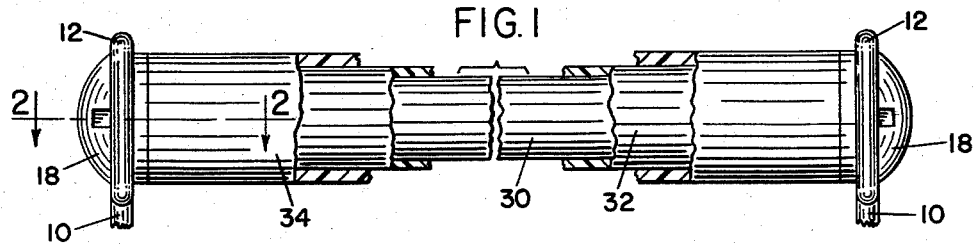
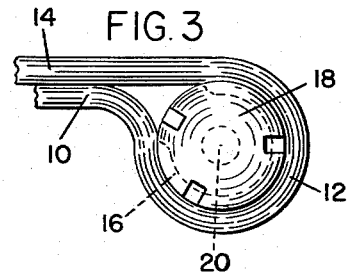
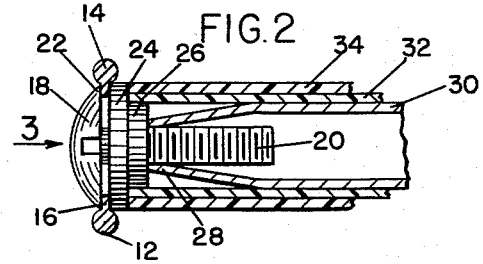
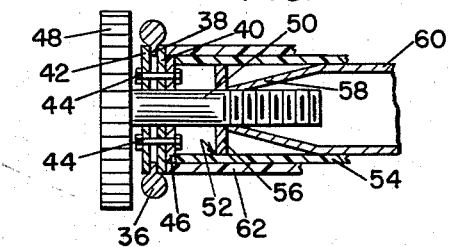
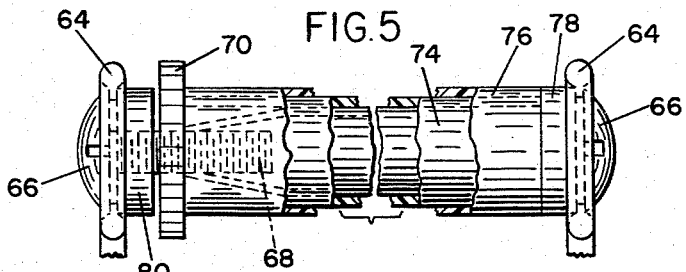
INVENTORS
ARMAND A. LACHANCE
STANLEY CIBOROWSKI
by Charles R. Jay
ATTORNEY

United States Patent Office 2,962,827
Patented Dec. 6, 1960

2,962,827

HANDLES FOR GROCERY CARTS AND IDENTIFICATION MEANS THEREFOR

Armand A. Lachance, North Oxford, and Stanley Ciborowski, Worcester, Mass. (both % American Metal Products Company, Southbridge St., Auburn, Mass.); said Ciborowski assignor to said Lachance Filed July 15, 1959, Ser. No. 827,248

9 Claims. (Cl. 40—308)

This invention relates to a new and improved handle for a grocery cart, and the principal object of the invention resides in the provision of not only providing identification means, price information, etc., on a grocery cart handle, as exemplified in copending patent application Serial No. 775,651 filed November 21, 1958, but also for an interchange of such information by actuation of the handle in a rotational manner so that the entire surface of the handle may be presented to the user of the grocery cart, the main portion of the handle being cylindrical in shape and capable of having information, prices, indexes, etc. imprinted thereon about the periphery thereof, said handle being rotatably mounted on the frame of the cart, to present the information to the user at all times and to use the entire periphery of the handle for this purpose; and at the same time the handle is strong and sturdy and useful for pushing the cart in the normal manner, said handle being capable of being taken apart quickly and easily for replacement, etc., but having means preventing the general public from removing the same.

Other objects of the invention include the provision of an identification handle as above recited, together with the use of a cover tube of clear plastic which permanently protects the advertising message, identification or store index and at the same time provides a very ornamental and strong long-lasting handle for carts of the class described.

A further object of the invention includes provision of means for holding the clear plastic protection tube fixed and rotating the message-bearing tube within the same; the provision of means for providing for the rotation of the protection tube and the message tube together; and also in various other forms and combinations of these parts.

Other objects and advantages of the invention will appear hereinafter.

Reference is to be had to the accompanying drawings, in which

Fig. 1 is a view elevation with parts in section illustrating the invention;

Fig. 2 is a section on line 2—2 of Fig. 1;

Fig. 3 is an end view of Fig. 1;

Fig. 4 is a view similar to Fig. 2 but showing a modification; and

Fig. 5 is a view similar to Fig. 1 but showing a modification.

In carrying out the present invention, the grocery cart has not been illustrated as it forms no part of the present invention except insofar as it is the device which bears the pusher-handle of the present invention, and reference is hereby made to the above-identified application, Fig. 1 of which shows in general a grocery cart having a handle according to the present invention.

The handle construction which is shown in Figs. 1, 2 and 3 in the present case includes the wire member 10 which is formed into an eye or loop 12 and then extends in parallel and in substantially contacting manner at 14 to extend therefrom to the basket of the cart as in the above identified application. In this case, however, the material of the eye 12 has been struck to form an interior substantially annular flat rim or flange which is indicated at 16. Against the outside flat surface of this flange there is placed the inner aspect of a head 18 of a theftproof bolt which may be as described in the above identified patent application and which has threads on the shank as indicated at 20. It will be observed that the head at 18 substantially fits the rib or flange 16 and that this rib or flange forms a strong and firm base for the head 18 by which means the handle to be described is securely fastened to the eye or loop 12. The edge of the head is hidden under the curved material of the wire of the loop as is clearly indicated at 22 in Fig. 2.

At the opposite side of the flange 16, there is provided a flat washer 24 and this washer has a central aperture for the reception of the screw-threaded shank 20 of the bolt. Arranged in flatwise contacting relation with washer 24, there is a second smaller washer 26 for a purpose to be described, but it is to be noticed that the edge of washer 24 overlaps the flange 16 and the head of the bolt at 18 and washer 24 together form a clamping means which clamps the entire assembly with reference to the wires 10, i.e., loop 12. The construction is the same at both ends of the handle but reversed.

A base tube generally indicated at 30 is provided at each end with a reduced portion 28 internally threaded to mesh with the threads on the shank 20 of the bolt. The ends of this tube bear against the washers 26 so that when the bolts at each end of the handle are turned up tightly against their respective flanges 16, the ends of the tube, abutting washers 26, securely clamp the entire apparatus in position relative to loops 12.

Rotatably and loosely mounted on the base tube 30, there is an opaque tube 32 which bears the messages which are desired to be imparted to the user of the grocery cart. Such messages can be of any type including prices, index, indication of where certain articles are located in the store, or any advertising message desired. This tube preferably abuts the surface of washer 26 but not so tightly as to impede the rotative motion of tube 32 which is adapted to be manually rotated on the surface of the base tube.

Exterior of tube 32, there is a clear plastic tube 34 which protects tube 32 and renders the same substantially permanent. Tube 34 is rotatably mounted on the periphery of washer 26 and the tubes 32 and 34 may be secured together if desired or they may be made to fit fairly tightly, so that when the user of the grocery cart rotates the clear tube 34, tube 32 rotates with it.

A modification of the invention is shown in Fig. 4 wherein the wire eye is indicated by the reference numeral 36 but it is the same as that at 12 and is provided with the same internal flange or bead 38 corresponding to that at 16. In this case, a pair of washers 40 and 42 are clamped together in any way as for instance by means of fasteners 44 against the opposite sides of the internal flange 38. Another smaller washer 46 may also be included in this assembly but it is to be noted that all of these parts are fixed firmly in position.

A turning knob 48 having a shank or shaft 50 is journalled in the apertures in the three washers described and it has an internal connection at 52 with the internal opaque tube 54 by means of a spider or a series of spokes generally indicated at 56. It is to be understood that shaft 50, spider 56 and tube 54 are all connected together but the shaft 50 is rotatable with respect to the spider 56 in order to screw into the threaded reduced end 58 of the base tube 60. When this is done, the base tube 60 will be clamped tightly against the member 56 and tube 54 and 60 will therefore be rotated together.

A fixed clear covered protecting tube 62 is also provided and this is attached and fixed in any way desired, either to washer 40 or washer 46. This can be done by cement or by inwardly directed radial fasteners of any kind desired.

In this form of the invention, the clear plastic tube which protects the assembly and the printing on the opaque part or tube 54 is held fixed in position and the interior mechanism is rotated by knob 48, but the effect is generally the same as the form of the invention shown in Fig. 1 except that it is impossible to rotate the tubes by grasping tube 62.

A still further form of the invention is shown in Fig. 5 wherein the eye 64 corresponds to that at 12 and in this form of the invention the head 66 of the bolt 68 is similar to that at 18. In this case, the turning knob is indicated at 70 and this turning knob is located anywhere between the two wire eyes 64, 64. The knob is fixed to the inner tube having the message at 74 and the outer tube 76 may be fastened in any way desired as for instance to a block or the like 78, in turn secured to the right-hand eye 64. In this case it is necessary to provide a spacing member 80 which keeps the assembly to the right-hand side of knob 70 from moving too far to the left in Fig. 5, but otherwise the construction is similar and a tie-bar or base tube may also be utilized in this construction by screwing in the ends 68 of the fasteners as above described with the other forms of the invention.

Having thus described our invention and the advantages thereof, we do not wish to be limited to the details herein disclosed, otherwise than as set forth in the claims, but what we claims is:

1. A handle construction for a cart having a framework including a pair of spaced wire loops, a washer associated with each wire loop at the innermost side of each loop, a tube extending between said washers, a bolt at each end of the tube, said bolts being threaded to said tube, a head on each bolt engaging said wire loops and securing the tube, washers and loops together rigidly, and an exterior tube telescopingly mounted on said first-named tube, said outer tube being rotatable thereon and bearing a printed message.

2. The handle construction of claim 1 including a third tube which is exterior relative to said printed tube and rotatable therewith, said third tube being transparent and protecting the printed matter.

3. A handle construction for a cart, said cart including a framework having a pair of looped wire members arranged in spaced parallel relationship, said handle construction being secured to and extending between said loops, a bolt at each end of said handle, a tube extending between said two loops and being threadedly engaged by said bolts, a head on each bolt, said heads engaging the loops at the outside aspects thereof, and a rotatable tube covering said first-named tube and including printed matter thereon.

4. The handle construction of claim 3 including an outermost protective clear transparent tube rotatable with the imprinted tube.

5. The handle construction of claim 3 including supporting means for said rotatable tube at each end thereof, said supporting means including a disc or the like abutting the inner edge of each one of said loops.

6. The handle construction of claim 3 including an inner circumferential flange on each of said loops, the heads of the bolts engaging said flanges at the outside aspects thereof, and disc-like members engaging said flanges at the inner aspects thereof, said bolt head being substantially broad and flat and having a diameter less than the diameter of said respective wire loops.

7. A handle construction for a cart having a frame comprising a fixed transparent outermost tube, means fixing the same relative to the frame of the cart, an inner tube having printed matter thereon, means journalling said inner tube on said frame construction, and means outboard of said frame construction and connected to said innermost tube, providing a handle for rotating the latter within the outermost tube.

8. The handle construction of claim 7 including a journal means mounting said innermost tube in the frame, and said outermost tube being secured to said means at the ends thereof.

9. A handle construction for a cart having a framework including a pair of wire loops in spaced parallel relation, said handle being mounted on said loops and including a clear plastic transparent tubular member fixed with respect to one of said loops, an inner tube bearing imprinted matter thereon, said inner tube being rotatable, means mounting said inner tube for rotation, a rotary knob secured to said inner tube and mounted intermediate the handle, an innermost tube extending between said loops, and means securing the loops and innermost tube together, the latter supporting the rotatable and fixed tubes.

References Cited in the file of this patent

UNITED STATES PATENTS 2,687,589    Brockway ---------- Aug. 31, 1954